Patented Jan. 16, 1940

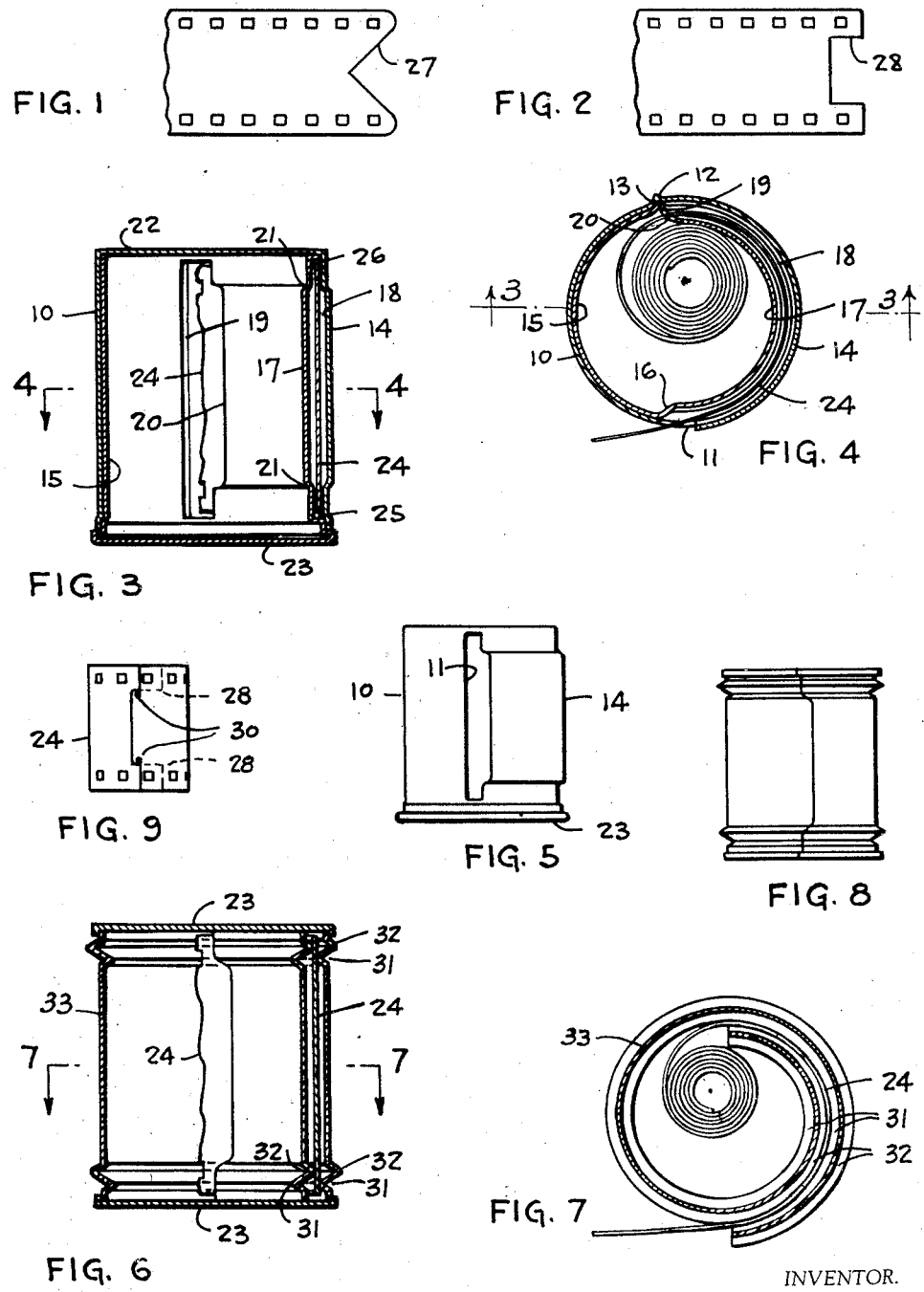

2,187,547

UNITED STATES PATENT OFFICE 2,187,547

ROLL FILM MAGAZINE CONTAINER FOR PHOTOGRAPHIC CAMERAS

Gordon B. Pollock, Los Angeles, Calif.

Application June 17, 1936, Serial No. 85,687

2 Claims. (Cl. 242—71)

My invention relates to roll film cartridges, magazines, or containers intended principally to be used with small hand photographic cameras for holding a roll of raw film in cartridge form to be loaded into an appropriate chamber in a camera, which container magazine will permit convenient manipulation of suitable lengths of film to a position for receiving the photographic exposure, and which, after the exposure, will facilitate transfer of such light-impressed portion of the film to a similar and interchangeable container magazine.

It is an important essence of the present invention to utilize the inherent curling tendency of sensitized film caused principally by the emulsion on the Celluloid surface to cause the film, first, to hug closely emulsion-surface-protecting and film-guiding rails of a curved light trap forming the entrance into the storage compartment of the magazine container, thus permitting very small clearances through the light trap without danger either of abrasion of the sensitized surface of the film or of undue friction of its edges with the guiding rails of said entrance passage, and, second, upon reaching the storage compartment, to resume its rolled condition—all without the use of springs to guide, or the usual spooling mechanism to roll.

Of course, such automatic resumption by the film of rolled condition on transfer to the receiving storage compartment of the container results in a looser roll; so that I contemplate that the raw film cartridge before being loaded into the container shall be sealed in a tighter and considerably smaller roll than necessary to fill the container storage compartment, thus allowing for an increase of diameter of the re-rolled film caused by such looseness of such automatic rewinding.

The magazine-container of the present invention is particularly designed for cameras of the construction of that illustrated and described in my co-pending application, S. N. 24,208, filed May 31, 1935, now Patent No. 2,129,959, for Camera, and is also an improvement upon the film spool-container of my co-pending application, S. N. 35,801, filed August 12, 1935, contemplating, as it does, a mechanism forming part of the camera for pulling the film from the raw film container and pushing it into the container for the exposed film. Some such means as that illustrated and described in my said application, S. N. 24,208 for propelling the film from one container to another is therefore implied as necessary to the utilization of the present invention.

Another feature of the present invention of such importance as to justify preliminary emphasis, relates to the shape of the slot through the outside of the container from or into the light trap. This is such as to allow an exceedingly small clearance for the edges of the film; and by reason of the combination of pre-curling of the film to correspond to the conformation of the curved rails of the light trap, and the notched ends of the film to permit guidance into the light trap without buckling, a minimum of clearance between the sensitized surface of the film and the light trap walls is also permitted, thus forming a very adequate light trap of the most simple, and consequently, economical construction. In this connection I remind that the drawing, being illustrative only, and not according to scale, greatly exaggerates, for the purpose of clarity, clearance through the light trap.

Principal objects of my said invention are the elimination of the film spool, the protection of the sensitized surface of the film from injurious abrasion at points of entrance into and exit from and through the light trap, by a simple and consequently economical construction permitting minute clearances, and eliminating interference with the movement of the film through the light-trap and into the film receiving compartment of the magazine container.

It is also an important object to utilize the natural tendency of the film to curl by comparatively tight rolling as a means of enabling compact storage in the receiving magazine container without the use of a spool, yet providing by a larger dimension than the diameter of the original rolled film cartridge for a looseness of re-rolling in the receiving storage compartment of an exposed film magazine container.

Another object is to so form the outside end of film that the manipulative edges of the film are advanced ahead of the exposure surface, to facilitate entrance of the body of the film into the light trap of a receiving magazine container and thereby minimize tendency of the film to jam in the light trap.

Still another object is to provide means for holding a film in smaller dimension than the inside of its container for the purpose of permitting the film to be pushed into another like container with a minimum of resistance and friction through a light trap, to conform to the shape of which, pre-curling of the film by tight rolling has contributed.

Other objects are to provide a neat, compact, easily manipulated, low-priced, film magazine, which not only will at all times protect all portions of the film from chance exposure-fogging, but which will provide a light and moisture proof receptacle for storage of the film both before and after exposure.

Other objects and corresponding advantages will be apparent to those of skill in this art upon an examination of the appended drawing and detailed description to follow.

In the drawing:

Figs. 1 and 2, respectively, represent outside end pieces of rolls of film adapted for use in the magazine container of my invention, said pieces of film showing the manner in which the outside end of the film is preferably cut;

Fig. 3 is a longitudinal section through the container showing certain of the parts in elevation, with a portion of the film, operatively disposed therein, partially broken away;

Fig. 4 is a section on line 4—4 of Fig. 3;

Fig. 5 is a side elevation of the magazine container of Figs. 3 and 4 on a reduced scale;

Fig. 6 is a longitudinal section similar to Fig. 3 but showing an alternative construction of the means for preventing abrasion of the exposure surface of the film;

Fig. 7 is a horizontal section on line 7—7 of Fig. 6;

Fig. 8 is a reduced side elevation of the modified construction illustrated in Figs. 6 and 7;

Fig. 9 represents the outside of a roll of film showing a means for holding the film in tightly rolled condition before threading through the camera and into the receiving container magazine.

Referring more particularly to the drawing in which like numerals indicate similar parts throughout the several views, 10 designates an outer, approximately hollow cylindrical wall longitudinally slotted parallel with its axis as indicated at 11 and, diametrically opposite said slot, and parallel therewith, being longitudinally embossed as indicated at 12 to form an interior groove 13. Said outer wall 10 is also embossed on one side between slot 11 and boss 12 as indicated at 14, to provide clearance for the sensitized surface of the film, as later more specifically described.

A segmental portion 15 of an approximately cylindrical inner wall, which is preferably formed of thin, slightly resilient material, such as brass, is adapted to telescope within outer wall 10, and is formed so that it will fit snugly against approximately half of the inner surface of outer wall 10.

At 16 said wall is slightly offset inwardly so that continuing portion 17 of said inner wall is spaced from the inner surface of outer wall 10, thus leaving a segment 18 of annular space between the walls, comprising a light trap passage.

19 indicates an outwardly extending radially disposed flange at one edge of inner wall portion 15, which is adapted to slide into groove 13 in the inner surface of outer wall 10, thus to hold all portions of said inner wall 15 in their intended assembled positions. Portion 17 of said inner wall is turned outwardly at the innermost end of the light trap and connected to the adjoining edge of flange 19 of said wall. An entrance slot 20 is formed in portion 17 adjacent its joinder to flange 19 to connect the light trap passage 18 with the interior of the container magazine for the passage of film therethrough.

Portion 17 of said inner wall is embossed inwardly as indicated at 21 to provide clearance space for the main portion of the film as it passes through light trap space 18 to or from the central storage compartment of the container.

One end of the cylindrical container of my invention may be covered by a closure plate 22 integral with the side walls 10, and the other end by a flanged cover 23 (as shown in Figs. 3 and 5) brazed, soldered, or otherwise secured in place, such means being well known in the art, or, as illustrated in Figs. 6 and 8, both closure plates may be like that indicated at 23.

In order that the edges of a film 24 being threaded through light trap space 18 for take-up within an exposed film container magazine, may more easily enter the narrow spaces 25 and 26 between unembossed edges of inner and outer walls, outer ends of film 24 are preferably cut as indicated at 27 and 28, Figs. 1 and 2.

The curl of the film 24, assisted by tight rolling, is utilized within the interior of the container magazine to eliminate the necessity for any form of spool, the film being held, until ready for use, in rolled position either by a small amount of adhesive on the underside adjacent the outer end of the roll of film and attaching it to the portion of the roll just beneath, which adhesion may be easily broken, without substantial injury to the film, by the movement necessary to withdraw the film from the container, or such rolled condition may be preserved until the film is ready for use by inserting the tongues 29 cut in film 24 into corresponding slots 30 cut in the edges of the film (as illustrated in Fig. 9).

In Figs. 6, 7, and 8 I have shown alternative means in a container 33 for holding the film in centralized position to prevent abrasion while passing through the light trap, such means comprising a corresponding crimping adjacent the edges of the inner and outer walls as indicated at 31 and 32, peaks of adjoining undulations being so spaced as to permit passing of the edges of the film 24 between them. In this latter embodiment the inner and outer walls are formed of one piece of material, an extension of the outer wall being spiralled within said outer wall.

While I have shown and described what I believe to be a preferable embodiment of my invention, it will be obvious to all of skill in this art that relative dimensions may be changed and various equivalent means may be utilized for providing an extended peripheral light trap and for centralizing the film so as to prevent abrasion while passing through the light trap.

While in Figs. 1 and 2 I have shown, respectively, triangularly and rectangularly notched ends of the film, it will be obvious that other forms for cutting such outside end of the film, such as a U-shaped notch, could be substituted without change of function or effect.

In the following claims when I refer to notched outer ends of the film, I mean any form of cutting which will advance the manipulative edges of the film ahead of the exposure surface thereof; and when I refer to pre-curled film, I mean film which has been impressed with a tendency to maintain its rolled condition, whether such tendency has been created by previous relatively tight rolling or by any other means.

What I claim and desire to cover by Letters Patent is:

1. In a device of the character described, a hollow substantially cylindrical container having a slot therein parallel to its longitudinal axis and a groove in its inner surface spaced from and parallel to said slot, a portion of said container adjacent said slot being outwardly embossed, a second cylinder telescoped within said first cylinder, an indented portion of said second cylinder, a flange on said second cylinder engageable with said groove to maintain said indented and embossed portions of said cylinders, respectively, adjacent, and a slot in said second cylinder parallel to its axis at the end of said indented portion thereof spaced from said slot in said first cylinder, and a pair of end plates closing the ends of said cylinders.

2. In a device of the character described, a container comprising a spiral wall having its edges crimped to form offset ridges on opposite side surfaces thereof, and means to close the ends of said container.

GORDON B. POLLOCK.